(12) United States Patent
Hendren et al.

(10) Patent No.: US 8,505,149 B1
(45) Date of Patent: Aug. 13, 2013

(54) VEHICLE WINDOW RUN CHANNEL CLEANING DEVICE

(75) Inventors: Jason Hendren, Milford Center, OH (US); Jesse Jarrett, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1292 days.

(21) Appl. No.: 12/032,015

(22) Filed: Feb. 15, 2008

(51) Int. Cl.
*A47L 1/00* (2006.01)

(52) U.S. Cl.
USPC .................. 15/220.1; 15/105; 15/104.001

(58) Field of Classification Search
USPC ............. 15/105, 111, 220.1, 220.3, 220.4
See application file for complete search history.

(56) References Cited

U.S. PATENT DOCUMENTS

| | | | |
|---|---|---|---|
| 2,133,087 A | 10/1938 | Ericsson | |
| 2,511,346 A | 6/1950 | Kennedy | |
| 2,824,323 A | 2/1958 | Tos et al. | |
| 4,355,432 A | 10/1982 | Storm, Jr. | |
| 4,683,783 A * | 8/1987 | Fanberg | 81/15.9 |
| 4,759,092 A | 7/1988 | Duddy | |
| 5,007,129 A | 4/1991 | Hainey | |
| D350,603 S | 9/1994 | Firlik | |
| 6,601,263 B1 | 8/2003 | Lam | |
| 6,779,219 B1 * | 8/2004 | Young et al. | 15/105 |
| 7,518,047 B2 * | 4/2009 | Koszela | 84/287 |
| 7,571,560 B2 * | 8/2009 | Peterman | 40/591 |
| 7,690,239 B2 * | 4/2010 | Griffis | 72/458 |
| 7,861,359 B1 * | 1/2011 | Ratzlaff | 15/160 |
| 2005/0150070 A1 * | 7/2005 | Persichina et al. | 15/236.01 |

* cited by examiner

*Primary Examiner* — Shay Karls
(74) *Attorney, Agent, or Firm* — Standley Law Group LLP

(57) ABSTRACT

A cleaning device and method for cleaning the window run channel of a vehicle without requiring that the vehicle door panel be disassembled. The cleaning device may include an elongate body with a handle at or near one end and a cleaning element at the other end. The cleaning element is designed for insertion between a window and its associated window run channel, and is operative to clean dirt and/or debris therefrom when moved along the length of the window run channel by manual or automated means. The cleaning element may also simultaneously clean a portion of the window.

15 Claims, 4 Drawing Sheets

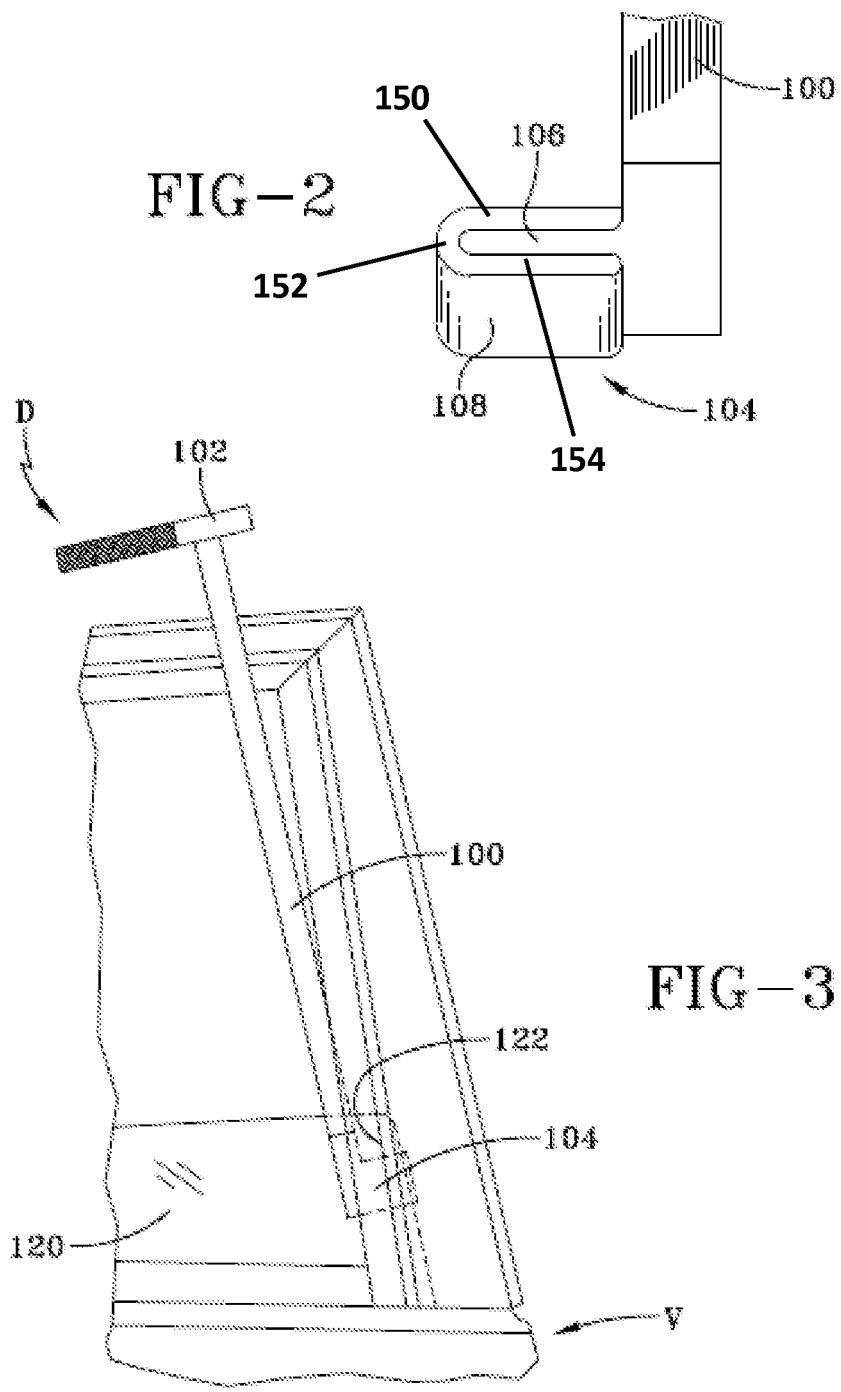

US 8,505,149 B1

VEHICLE WINDOW RUN CHANNEL CLEANING DEVICE

INVENTIVE FIELD

The present invention is directed to a device and method for cleaning a window run channel of a vehicle. More particularly, the present invention is directed to a device and method that allows for the cleaning of a vehicle window run channel without the need to disassemble an associated vehicle door.

BACKGROUND OF THE INVENTIVE FIELD

Over time, the movement of a vehicle window may become restricted, such as in the form of more difficult operation and/or less than a full range of motion. Many times, this restricted movement results simply from the build up of dirt and/or debris in an associated window run channel that is located in the vehicle door.

While oftentimes simple in cause, such restricted window movement is nonetheless frequently misdiagnosed by service personnel. For example, particularly in the case of a vehicle with power windows, restricted window movement is commonly misdiagnosed as a failure of the window drive motor and/or other related components Obviously, replacing such vehicle window components can be costly. Therefore, avoiding such a misdiagnosis by first ensuring that restricted window movement is not actually caused by a build up of dirt and/or debris in the window run channel would be advantageous.

Consequently, it can be understood that there is a need for a device and method for cleaning dirt and/or debris from vehicle window run channels. Preferably, such a device and method would allow a user to clean window run channels in a timely manner without having to remove any part of an interior door panel during the cleaning process. Preferably, such a device would also clean a portion of the window that moves within the window run channel. It would also be preferable that such a device is simple in design and easy to transport and use. A device and method of the present invention satisfies these needs/preferences.

SUMMARY OF THE GENERAL INVENTIVE CONCEPT

The present invention is directed to a cleaning device and method for cleaning the window run channel of a vehicle while the associated window resides at least partially within an assembled door panel. At least certain embodiments of the present invention include an elongate body with a handle at one end and a cleaning element at the other end, the cleaning element operative to enter into and clean dirt and/or debris from the window run channel. A device of the present invention may be easily manually operated to move along the length of the window run channel and to remove dirt and/or debris therefrom. An automated device of the present invention may also be provided to perform such cleaning.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 2 is an enlarged view of a cleaning element portion of the embodiment of FIG. 1;

FIG. 3 illustrates the cleaning element portion of FIG. 2 being inserted between a window and a window run channel of an exemplary vehicle;

FIG. 5b is a front elevation view of the detachable cleaning element of FIG. 5a.

DETAILED DESCRIPTION OF EXEMPLARY EMBODIMENT(S)

Figure 1:
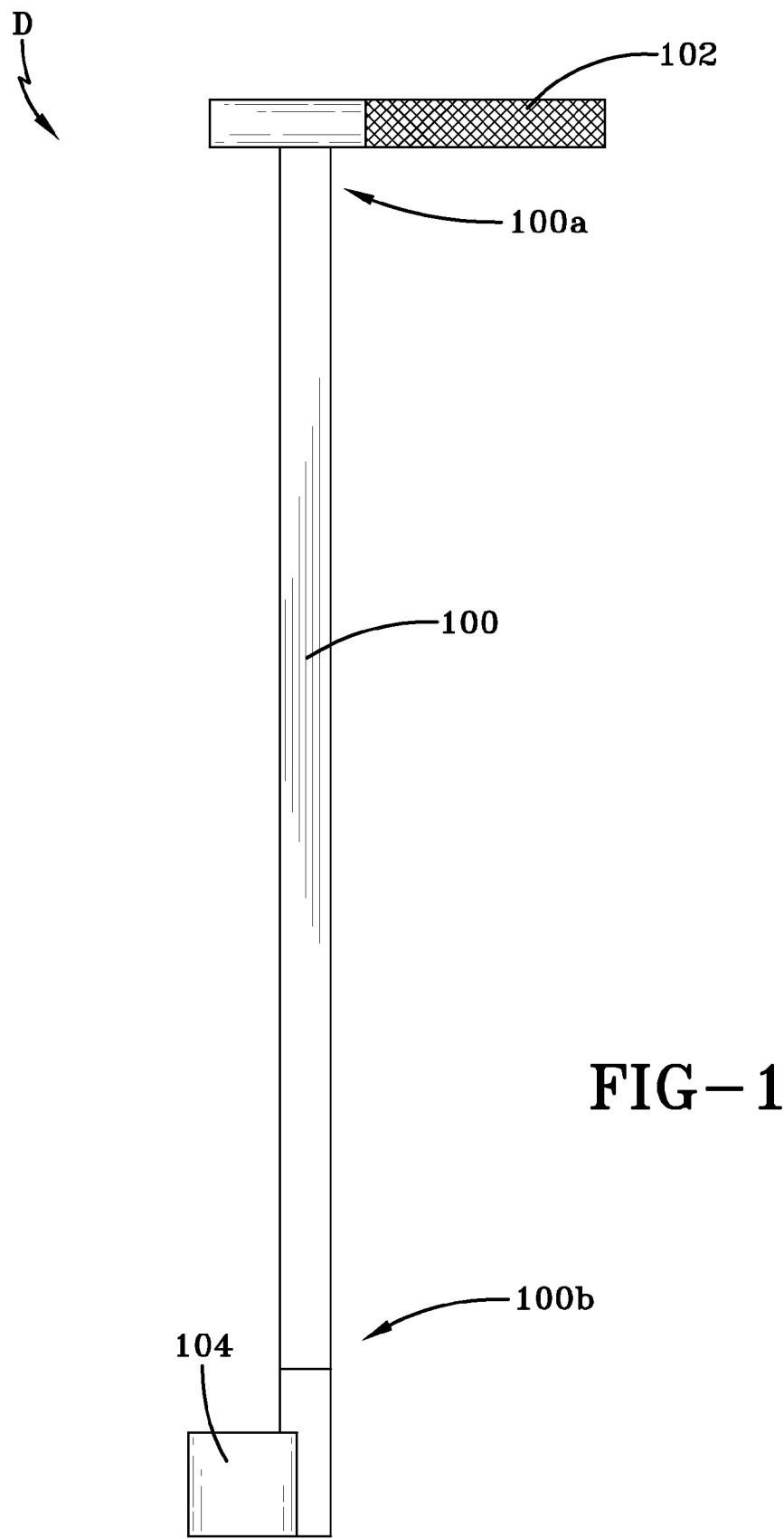
FIG. 1 is a perspective view illustrating one exemplary embodiment of a cleaning device of the present invention.

FIG. 1 depicts one exemplary embodiment of the present invention. As shown, this particular vehicle window run channel cleaning device D (hereinafter "cleaning device") is shown to have an elongate body 100 with a first and second end 100a, 100b, a handle 102 that may be attached to the first end of the elongate body, and a cleaning element 104 that may be attached to the second end of the elongate body. In this exemplary embodiment, the handle 102 is attached to the elongate body 100 by a weld. However, depending on the materials used to construct a cleaning device of the present invention, and or other design or operational factors, one skilled in the art would understand that the handle 102 may also be attached to the elongate body 100 by any number of fastening means, such as various threaded fasteners, adhesives, etc. It is also possible for the handle 102 to be integral to the elongate body 100, such as by molding or other manufacturing techniques.

In this embodiment, the handle 102 is tubular in shape to facilitate grasping of the cleaning device by a user during use thereof. However, it should be realized that the handle 102 may have any number of cross-sectional geometries that permit gripping during use of the cleaning device D, whether by a user during manual operation, or by a machine during automated operation. Similarly, the handle 102 may be made of any number of materials that are of sufficient strength to permit proper operation of the cleaning device D.

The elongate body 100 of the cleaning device D may also be constructed from various materials, such as, for example, steel, fiberglass, plastics or other metals. Preferably, the elongate body 100 has sufficient strength to withstand the use of the cleaning device 5. Preferably, but not necessarily, the elongate body 100 exhibits some degree of flexibility to facilitate installation and use of the device in cleaning a window run channel. While an elongate body of the present invention may be of various cross-sectional shape, the cross-sectional shape of this particular elongate body 100 is rectangular. As such, the elongate body 100 may be manufactured from readily available sizes of bar stock, thereby reducing manufacturing time and expense.

Referring now to FIG. 2, an enlarged view of the cleaning element 104 can be observed. Preferably, the cleaning element 104 is adapted to simultaneously clean both an inside surface of a window run channel 122 and a portion of a window 120 that travels within the channel. To this end, this particular cleaning element 104 is formed from a first leg 150 that extends substantially perpendicularly outward from the second end 100b of the elongate body 100, a joining member 152 connected at one end to the first leg and insertable between the window run channel 122 and a window 120 positioned therein, and a second leg 154 connected to the other end of the joining member and extending substantially parallel to the first leg. The cleaning element 104 is thus substantially U-shaped with an inner surface 106 and an outer surface 108. The inner surface 106 comprises a groove that is designed to engage a portion of the window 120, while at least a portion of the outer surface 108 is simultaneously engaged with the inner surface of the window run channel 122.

In this particular embodiment, the cleaning element 104 is welded to the elongate body 100. However, as with the handle 102 discussed above, various other joining techniques may be employed. As such, a cleaning element may be permanently or removably attached to an elongate body portion of a cleaning device of the present invention.

In order to minimize the potential for scratching of the window 120, and possibly the window run channel 122, the cleaning element 104 may be covered or coated with a material that is substantially non-abrasive. This covering or coating may be permanent in nature, such as in the form of Teflon® or another low-friction material. Alternatively, a removable and replaceable covering such as a fabric sheath may be employed. In other embodiments, the cleaning element 104 may be partially or entirely constructed of a substantially non-abrasive material (e.g., a high molecular weight plastic).

Figure 4:
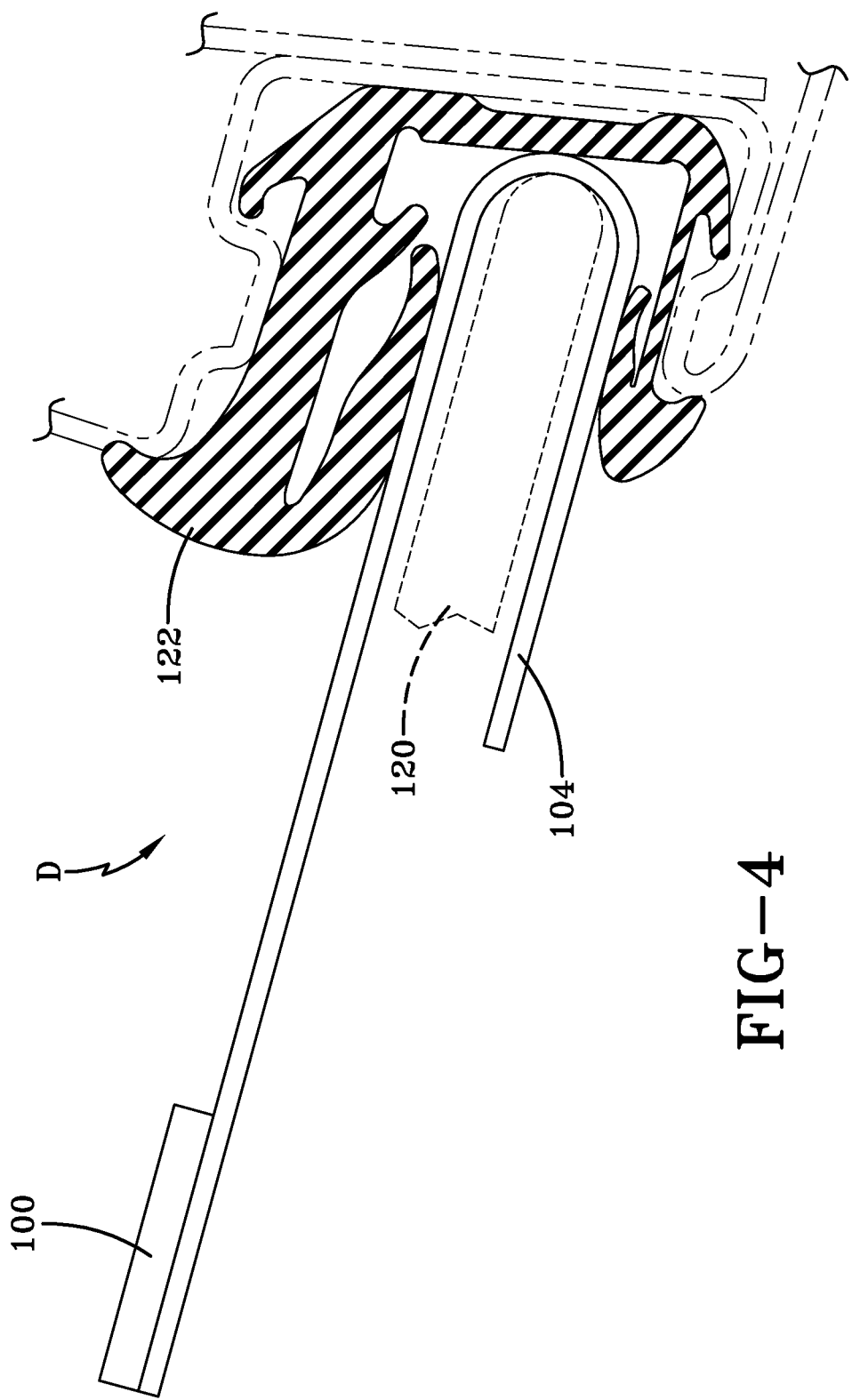
FIG. 4 is a top plan view, in partial cross-section and partial transparency, depicting a cleaning element portion of one embodiment of an exemplary cleaning device of the present invention inserted between an exemplary window and window run channel.

FIGS. 3-4 illustrates how this particular embodiment of the cleaning device D may be put into operation. First, the window 120 of the vehicle V is opened at least partially to provide access for the cleaning element 104. The cleaning element 104 of the cleaning device D is then positioned between the window 120 of the vehicle and a portion of the window run channel 122 that is accessible from outside the door assembly of the vehicle. Once the cleaning element 104 has been inserted into the window run channel 122, a user (or an automated apparatus) moves the cleaning device D downward along the window run channel and into the vehicle door such that the cleaning element resides between an outer surface of the window 120 and the inner surface of the window run channel (see FIG. 4).

Movement of the cleaning element 104 of the cleaning device D within the window run channel 122 acts to remove dirt and/or debris that is situated between the window 120 and the window run channel. In this exemplary embodiment, the movement of the cleaning element 104 is also effective to simultaneously clean dirt and/or debris from a portion of the window 120 that underlies the cleaning element 104—which is preferably at least that portion of the window 120 that travels in the window run channel 122. The cleaning element 104 may be reciprocally moved with the window run channel 122 any number of times as necessary to effectuate a desired level of cleaning. Once cleaning is deemed sufficient, the cleaning element 104 is withdrawn from the window run channel 122 and the cleaning device is removed from the vehicle D.

As mentioned above, other embodiments of the present invention may employ automated means to operate the associated cleaning device. Additionally, in the exemplary embodiment of the cleaning device D shown and described herein, and/or in other exemplary embodiments of the present invention, it is possible to use a cleaning agent to enhance the window run channel and/or window cleaning operation. When used, a cleaning agent may be applied to either or both of the cleaning element 104 and the window run channel 122. Such a cleaning agent may help expedite the time required to remove dirt and debris from the window run channel 122 and/or window 120.

Figure 5C:
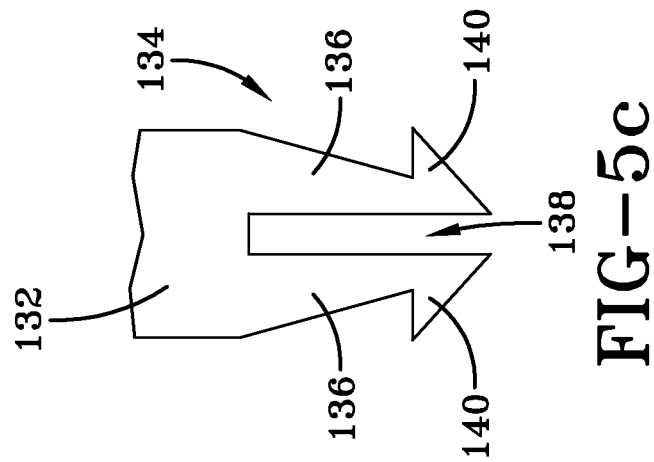
FIG. 5c is a front elevation view of an associated exemplary elongate body connecting portion.
Figure 5A:
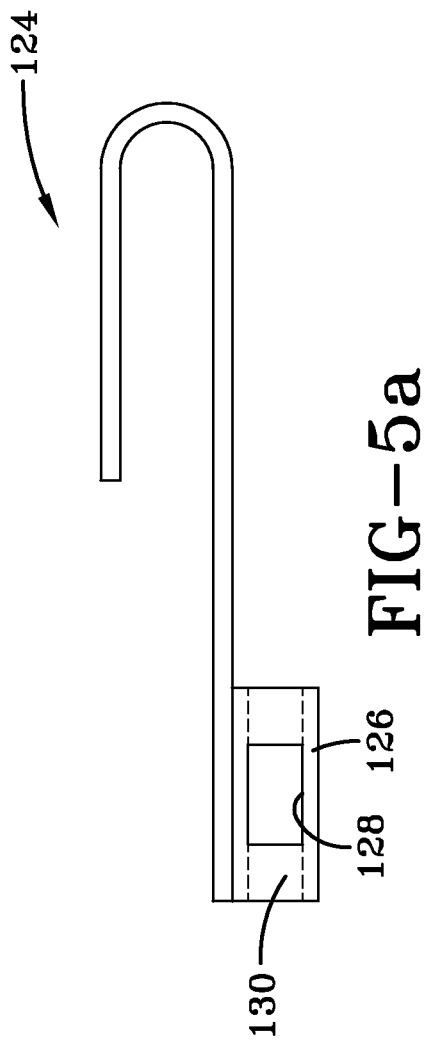
FIG. 5a is a top plan view of one exemplary embodiment of a detachable cleaning element of the present invention.
Figure 5B:
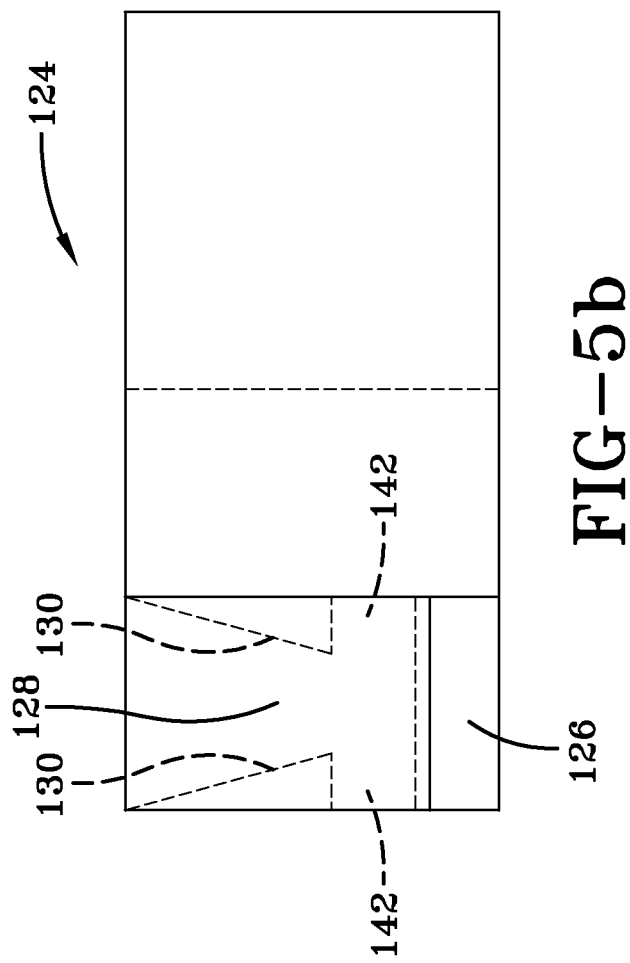

One exemplary embodiment of a detachable cleaning element design is illustrated in FIGS. 5a-5c. As shown in FIGS. 5a-5b, the cleaning element 124 includes an attachment portion 126 for receiving and releasably engaging a mating connector 134 of an associated elongate body 132 shown in FIG. 5c.

As would be apparent to one skilled in the art, such a releasable connection could be accomplished in a number of different ways, any and all of which are considered to be within the scope of the present invention. In this particular exemplary embodiment, however, the cleaning element attachment portion 126 includes a receptacle 128 having a pair of laterally opposed and inwardly sloping projections 130. The receptacle is designed to receive the elongate body mating connector 134, which includes a pair of opposed retaining arms 136. The retaining arms 136 are preferably resilient in nature, such that the retaining arms will return substantially to their normal position after being forcibly displaced.

The retaining arms 136 of the elongate body mating connector 134 are preferably spaced apart, such as by the interposed slot 138. The gap provided by the slot 138 allows for the forced inward displacement of the retaining arms 136. Each retaining arm 136 of this particular embodiment includes a substantially hook-shaped element 140 that is provided to assist with the releasable retention of the cleaning element 124 on the elongate body 132.

In operation, the mating connector 134 of the elongate body 132 is inserted into the receptacle 128 of the cleaning element receiving portion 126. As the mating connector 134 is inserted into the receptacle 128, the sloping projections 130 thereof cause an inward displacement of mating connector retaining arms 136. This inward displacement causes the retaining arms 136 to exert an outwardly directed spring force against the sloping projections 130. When properly inserted into the cleaning element receiving portion 126, the hook-shaped element 140 of each retaining arm 136 engages a bottom face of an associated sloping projection 130. This engagement, coupled with the outwardly directed spring force of the retaining arms 136, resists unintended removal of the mating connector 134 from the cleaning element receiving portion 126. One or more apertures 142 may be provided through the cleaning element receiving portion 126 for facilitating deliberate disengagement of the mating connector 134 from the cleaning element receiving portion by allowing for inward displacement of one or both of the retaining arms 136.

While certain embodiments of the present invention are described in detail above, the scope of the invention is not to be considered limited by such disclosure, and modifications are possible without departing from the spirit of the invention as evidenced by the following claims:

What is claimed is:

1. A device for simultaneously cleaning a window and window run channel of a vehicle, comprising:
   an elongate body with a first and second end;
   a handle attached to the first end of the elongate body and extending perpendicularly outward from the elongate body, the handle extending from the elongate body a distance shorter in length than the elongate body; and
   a cleaning element extending outward from the second end of the elongate body, the cleaning element being substantially U-shaped and defining a groove having an open end that faces in a direction that is substantially perpendicular to the length direction of the elongate body, the cleaning element being dimensioned to be positionable between the window and the window run channel to place an edge of the window in the groove to allow the cleaning element to simultaneously clean both an inside surface of the window run channel and at least a portion of both sides of the window that travels within the channel.

2. The device of claim 1, wherein the groove in the cleaning element lies in a plane that is substantially parallel to the plane of the elongate body but laterally offset therefrom.

3. The device of claim 1, wherein the cleaning element is permanently affixed to the elongate body.

4. The device of claim 1, wherein the cleaning element is releasably affixed to the elongate body.

5. The device of claim 1, wherein the elongate body is rectangular in cross-section.

6. The device of claim 1, wherein the elongate body is substantially flexible.

7. The device of claim 1, wherein the cleaning element is covered or coated with a material that is substantially non-abrasive.

8. The device of claim 1, wherein the cleaning element is manufactured of a high molecular weight plastic.

9. A device for use in cleaning a vehicle window run channel, comprising:
   an elongate body with a first and second end; and
   a cleaning element, the cleaning element comprising:
      a first leg attached directly to the first end of the elongate body and extending perpendicularly outward from the elongate body, the first leg extending a distance shorter than the elongate body,
      a joining member extending from the first leg and insertable between the window run channel and a window positioned in the window run channel, and
      a second leg extending from the joining member parallel to the first leg, the second leg positioned with the first leg and the joining member to form a groove having an open end that faces in a direction that is substantially perpendicular to the length direction of the elongate body and is shaped to receive an edge of the window when the joining member is positioned between the window and the window run channel to allow the cleaning element to simultaneously clean both an inside surface of the window run channel and at least a portion of a window that travels in the channel;
   wherein, the cleaning element and the elongate body are arranged to be simultaneously insertable into a door within which the window is installed while the cleaning element is positioned between the window and the window run channel, so as to permit movement of the cleaning element within the window run channel via movement of the elongate body, and a resultant cleaning of a portion of the window and window run channel that resides within the door.

10. The device of claim 9, wherein the cleaning element is permanently affixed to the elongate body.

11. The device of claim 9, wherein the cleaning element is releasably affixed to the elongate body.

12. The device of claim 9, wherein the elongate body is rectangular in cross-section.

13. The device of claim 9, wherein the cleaning element is covered or coated with a material that is substantially non-abrasive.

14. The device of claim 9, wherein the cleaning element is manufactured of a high molecular weight plastic.

15. The device of claim 9, wherein the groove in the cleaning element lies in a plane that is substantially parallel to the plane of the elongate body but laterally offset therefrom.

* * * * *